No. 758,479. PATENTED APR. 26, 1904.
J. J. SANDVIG.
RAIN WATER CUT-OFF.
APPLICATION FILED JAN. 26, 1904.
NO MODEL. 2 SHEETS—SHEET 1.
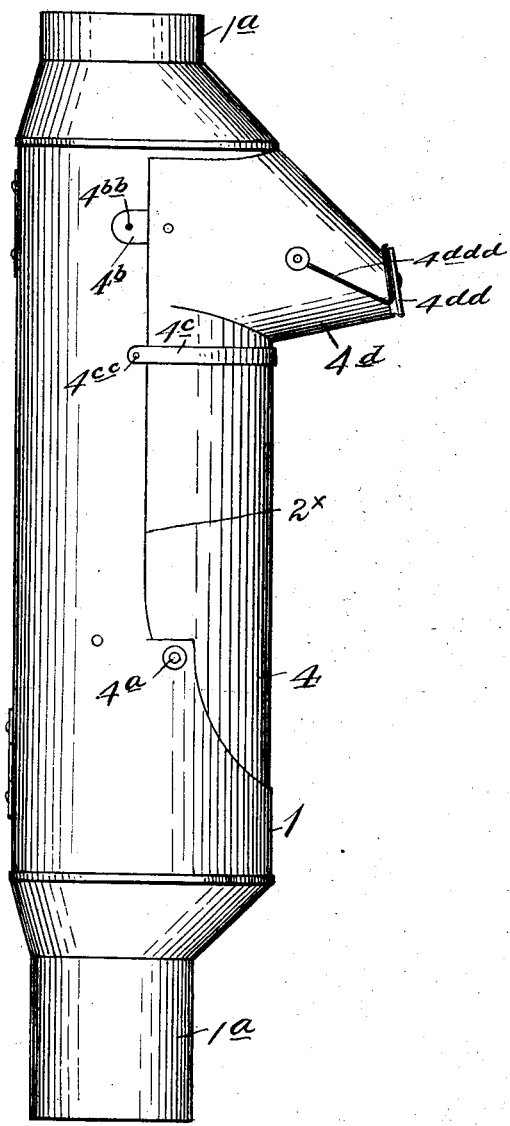
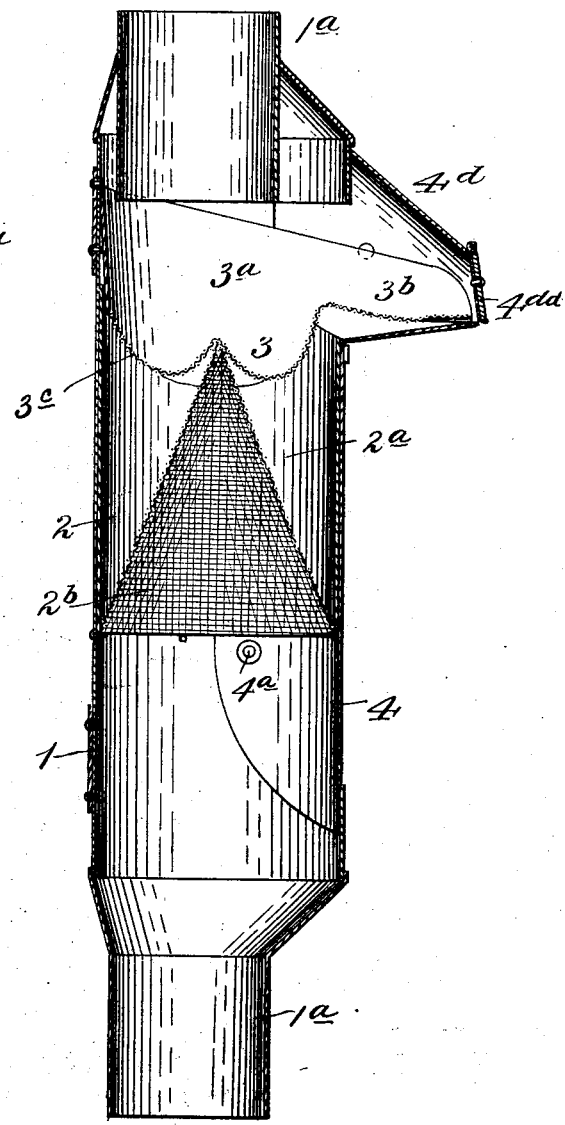
Witnesses:
Inventor:
John J. Sandvig
By Lewis Bagger & Co.
Attorneys

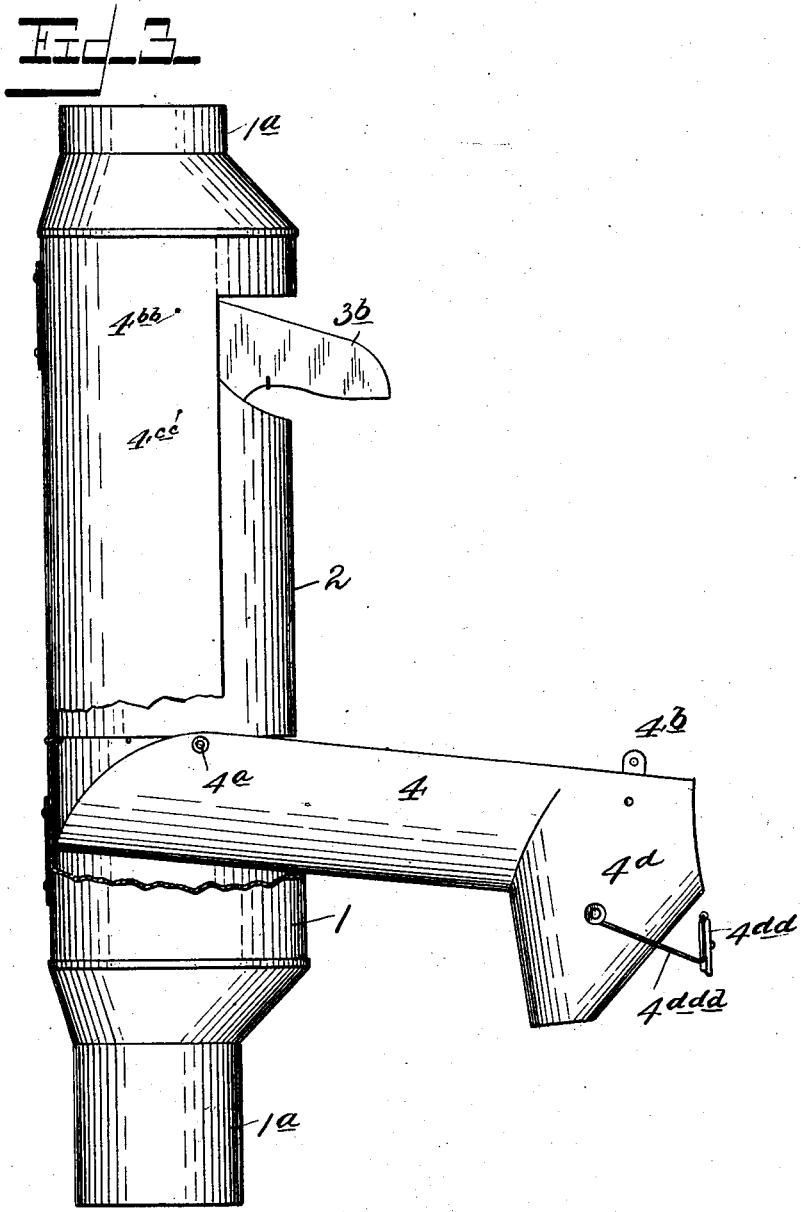

No. 758,479.

Patented April 26, 1904.

UNITED STATES PATENT OFFICE.

JOHN J. SANDVIG, OF WILMOT, SOUTH DAKOTA.

RAIN-WATER CUT-OFF.

SPECIFICATION forming part of Letters Patent No. 758,479, dated April 26, 1904.

Application filed January 26, 1904. Serial No. 190,694. (No model.)

*To all whom it may concern:*

Be it known that I, JOHN J. SANDVIG, a citizen of the United States, residing at Wilmot, in the county of Roberts and State of South Dakota, have invented certain new and useful Improvements in Rain-Water Cut-Offs, of which the following is a specification.

My invention relates to improvements in what may be termed "rain-water cut-offs," especially designed for use in connection with "spouting" on houses.

It has for its object to secure convenience and facility, particularly in directing or delivering the water from the house to the cistern or into a receptacle or bucket suitably disposed.

It also provides for effectively or thoroughly filtering the water, while it is simple, readily constructed, and easily applied.

Said invention consists of certain structural features, substantially as hereinafter more fully disclosed by the following description, and particularly pointed out by the claim concluding said description.

In the accompanying drawings, illustrating the preferred embodiment of my invention, Figure 1 is a side elevation thereof. Fig. 2 is a sectional elevation of the same. Fig. 3 is a view with parts broken away and the pivoted or hinged member lowered into horizontal position, as in delivering or directing the water into a bucket or other like receptacle, the upright member being shown partly in section at the point of conjunction thereof with the inner end of said pivoted member.

In the carrying out of my invention I employ an enlarged pipe-like section 1, preferably somewhat greater in cross-section than that of the usual house-spout, having at its ends, however, reduced terminals $1^a$, adapted to be inserted into such house-spout at the desired point intermediately of its length and a suitable distance from the surface or ground, as convenience or facility would suggest. Within said enlarged pipe-section 1 is arranged a filter 2, comprising a pipe-section $2^a$, much shorter than the first named and having secured at its lower edge or end a conical or tapered fine wire cloth or gauze bottom $2^b$, extending within the part $2^a$ nearly its entire length, its apex or taper being presented upward and about centrally of the latter. By this construction it will be noted that a greatly enlarged or extended area of filtering-surface is provided, the advantage of which is obvious, and that the sediment is prevented from so readily choking or obstructing the filter as would otherwise be the case, said sediment being directed or deflected toward the divergent or flared bottom edges out of the direct plane of the filtering-surface thereof. The filter 2 is inserted laterally through a longitudinal opening $2^x$ in the side of the casing 1, of considerably greater length than said part 2, however, for an additional purpose presently made apparent, and as said filter is held in place within said casing by the lateral pressure of the same upon the latter, due to the greater or less resilient nature of the thin or sheet metal of which the tubular portion of said filter is made, it may be readily removed when required and again as quickly returned to its position in said casing or pipe-section. Also arranged within the casing or pipe-section 1 is a second filter 3, resting upon the upper end or edge of the tubular portion of the filter 2. Said filter consists of an arcuate or cylindric part $3^a$, with its walls extended or prolonged at opposite side edges of the lateral opening therein, forming a spout $3^b$, projecting beyond the lateral walls of said casing, said arcuate part $3^a$, together with the spout $3^b$, having secured to their lower edges a fine wire cloth or gauze bottom $3^c$. Said gauze bottom, it will be noted, is dished or concaved considerably downward within the plane of the arcuate or cylindric part $3^a$, thus correspondingly dropping therein below the point where the bottom of the spout $3^b$ unites therewith, whereby when a rush or undue flow of water takes place within the casing or pipe-section 1 the same will not precipitately pass off via said spout without having been first filtered.

A gutter or trough-like member or section 4, being also arcuate or semicircular in general cross-section, is pivoted or hinged at opposite points near its lower end to the inner side of the casing 1, as at $4^a$, it having said end inserted through the longitudinal opening $2^x$ into said casing. Therefore when said trough or member is clasped laterally against said casing, as later described, said end of said member 4 will lap or fit against the inside of said casing, and said member thus held or disposed will effectually close the longitudinal opening $2^x$ in said casing. The securing or holding of said trough or member 4 against said casing is effected, preferably, by apertured spring-clasps $4^b$, projecting from the upper rear edges thereof and having their apertures engaging or sprung over projections or pins $4^{bb}$ on said casing. It may also be further held in such position by means of an additional spring-metal clasp $4^c$, embracing the same transversely and also having apertures engaging or sprung over additional pins or projections $4^{cc}$ on said casing, as shown. Said member or trough 4 has also at its normally upper end a chute-like extension $4^d$, adapted when said member is in its upright normal position to receive and house the spout portion $3^b$ of the filter 3, said extension also serving as a spout, as presently seen. The tapered open end of said chute or spout is adapted to be closed to cut off any possible escape of water which may pass out upon the spouted portion of the filter 3 when the trough 4 is not in use as such or in its upright position by a gate or valve $4^{dd}$, preferably weighted to provide for its closing by gravity, said gate having fixed arms $4^{ddd}$ pivotally connected laterally to said spout or extension.

The device when the trough member 4 is in upright position provides for delivering or directing the water from the house-spouting finally into a cistern, said water of course passing through and being effectively or thoroughly filtered by the plurality of filters 2 and 3. When it may be desired to deliver or conduct the water into a bucket or other like receptacle, the member 4 is unclasped at its normally upper end from the casing 1 and disposed in a generally horizontal position, the same, however, being slightly inclined forward and downward to aid the proper flow of the water, with its spout or chute resting directly above such receptacle, suitably placed with that end in view. The gate or valve $4^{dd}$ is of course adjusted into its open position, and thus held by being suitably disposed or swung upward and backward, as shown. The inner end of the trough or member 4 will thus be arranged to cut off the further flow of the water through the casing 1, the water then passing along said trough out through its spout into the pail or receptacle. Any overflow of water from the upper filter 3 will after proper filtration by passing through the additional filter formed by the gauze bottom of the spout $3^c$ be received into the trough 4, as is obvious. When the chute or spout $4^d$ is in position to house the spout $3^b$, it will be noted that it will drain or return any water flowing out upon and through said spout $3^b$ back into the casing 1.

Latitude is allowed as to details herein, as they may be changed as circumstances suggest without departing from the spirit of my invention and the latter yet be protected.

I claim—

A device of the character described, having arranged therein, a filter having a gauze-bottomed spout extension, and a hinged trough member, with its inner end movable into alinement with said filter and having its outer end provided with a chute or spout adapted to either house said spout extension or to be removed therefrom as in directing the water-flow into a pail or like receptacle and receive the overflow water from said spout extension when thus removed.

In testimony whereof I have signed my name to this specification in presence of two witnesses.

JOHN J. SANDVIG.

Witnesses:
  JNO. A. MUNRO,
  RALPH H. EASTMAN.